UNITED STATES PATENT OFFICE.

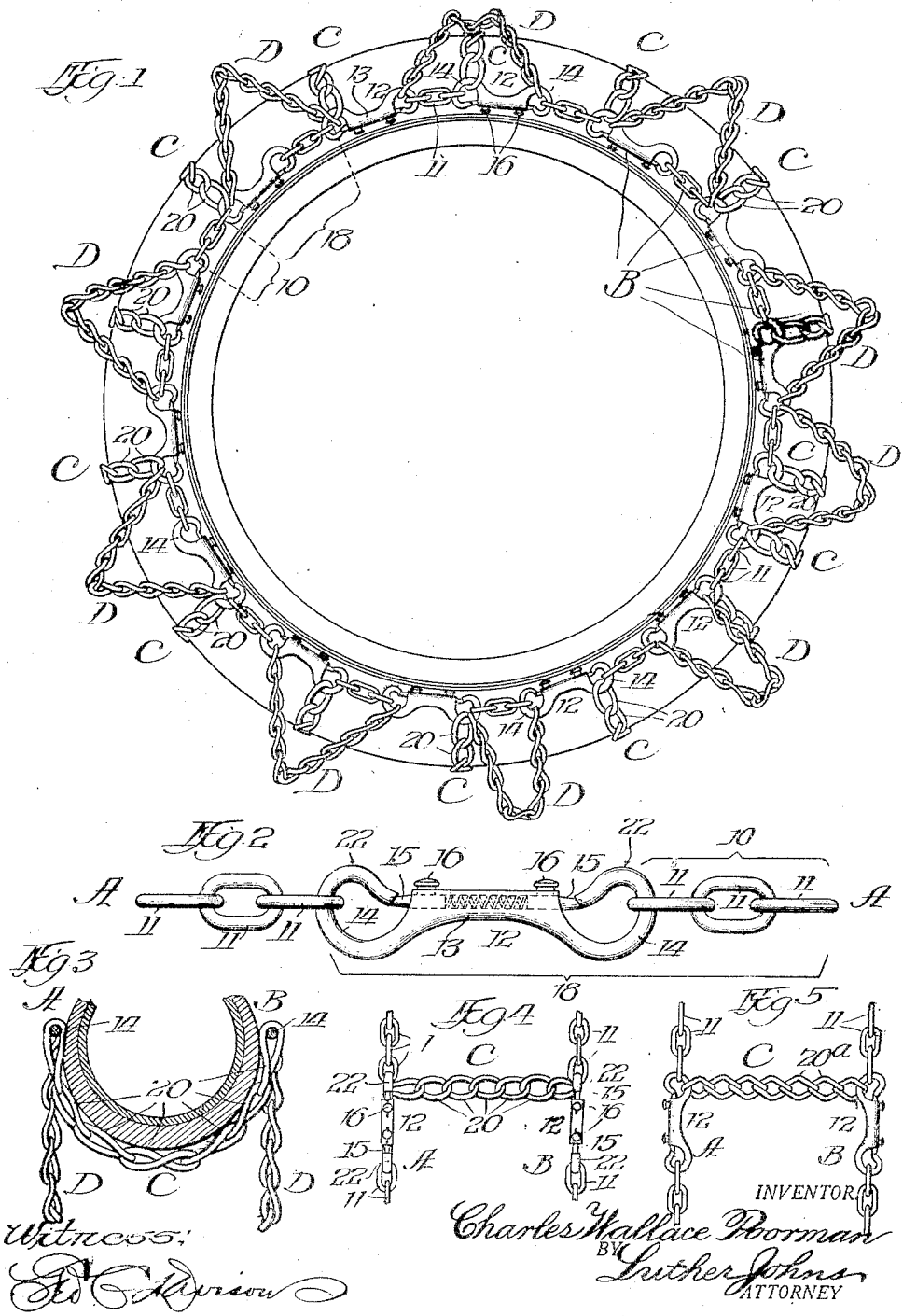

CHARLES WALLACE POORMAN, OF OAK PARK, ILLINOIS.

ANTISKID DEVICE.

1,329,628.  Specification of Letters Patent.  Patented Feb. 3, 1920.

Application filed February 26, 1917. Serial No. 150,942.

*To all whom it may concern:*

Be it known that I, CHARLES WALLACE POORMAN, a citizen of the United States, and a resident of Oak Park, in the county of Cook and State of Illinois, have invented certain new and useful Improvements in Antiskid Devices, of which the following is a specification.

My invention relates to devices for vehicle wheels, commonly known as tire chains, which are designed to improve the traction properties of the wheel and to afford safeguard against lateral movement of the vehicle, ordinarily known as "skidding."

The principal objects of these improvements are to provide a device of the character described in which repairs may be made without difficulty or substantial, if any, expense, and at the time when and place where the immediate necessity for the repairs exists; to provide a device which will have long life in service, the major portion of the structure being such as to wear indefinitely, the wear portions being readily replaceable at a minimum of time and expense; also to provide high anti-skidding efficiency in a device of simple construction, one which may be readily applied to a wheel and readily detached therefrom, one of few and simple kinds of parts, of parts readily interchangeable as occasion may suggest, of parts readily and cheaply replaceable when broken or greatly worn, and of parts susceptible of connection one with the other in such manner that the same device may be used on wheels or tires of different diameters respectively within wide limits.

Further objects and advantages will appear hereinafter.

In the accompanying drawings, which form a part of this specification, I have illustrated what I conceive to be the best mode of carrying these improvements into practice, but reference should be had to the appended claims to determine the scope of these improvements as the invention is not limited to the arrangement or construction of parts shown. In these drawings Figure 1 is a side view of a vehicle tire with these improvements thereon; Fig. 2 shows in side view an enlarged fragment of one of the two annular side members; Fig. 3 is a cross sectional view of the device on a scale somewhat enlarged over that of Fig. 1; Fig. 4 is a face view of a fragment of the device, on the scale of Fig. 1, showing the side members and a cross member; and Fig. 5 shows a fragment wherein the cross chains or units are modified from those illustrated in the other figures.

In Fig. 1, for the sake of clearness of illustration, the device is shown symmetrically upon the tire. In actual practice, as is well understood, flexible attachments of the general character described are so loosely positioned on the tire as to sag at the lower portions to quite a considerable extent out of the truly concentric arrangement shown.

The complete device illustrated comprises a pair of similar side members A and B (only one of which is completely shown), a plurality of cross members C and a plurality of anti-skidding elements D. The anti-skid devices D may be omitted without prejudice to the many advantages derived from the construction and arrangement of the members A, B and C when used mainly for increased traction upon the ground, and, on the other hand, such elements D may advantageously be employed with flexible tire chains having side members connected by any arrangement of cross members and constructed otherwise than as herein shown.

Each side member A and B comprises a plurality of short chain sections 10 consisting preferably of an odd number of links 11, say three, the links being preferably of the flat type whereby there is no tendency in service to throw the hook elements 12 into twisted relation with each other or with the tire. These hook elements or connecting pieces 12 are preferably double locking hooks having a shank or body portion 13, an eye portion 14 having an opening in a side thereof, and a closure 15 for the eye opening, the closure 15 being spring-pressed into engagement with the free end of the eye, and being readily retractable by the finger piece 16 whereby chain links or the like may readily be inserted into locked relation with the eye portion 14, and be as readily removed therefrom. The short sections 10 and the double locking hooks 12 alternate with each other, thus forming a flexible ring adapted to lie adjacent to the side of the tire when normally applied thereto. In view of structural modifications which will readily occur to persons skilled in the art, a short section 10 and a locking element 12 connected together may be considered a side member unit 18, there being a succession of such relatively short units in end to end arrangement, the unit ends contiguous to each other having interlocking means readily operable by hand for holding the units together.

The cross members or tread elements C are preferably chains, the links 20 or 20<sup>a</sup> of which are preferably relatively wide and so constructed as to lie substantially flat against the tire, whereby there is little tendency of the chains C to roll upon the tire when the device is in use.

It will be noted that the cross members C are interlocked with the side members A and B by the double locking hooks or connecting pieces 12, all of the parts thus far described being thus readily assembled and as readily taken out of their assembled relation. It is pointed out that when a tire chain breaks it is usually at a time when and place where the necessity for such safety devices is urgent. Where tire chains consist of a unitary structure with the cross chains permanently fastened to the side members, the side members being of continuous chain construction except for locking means at one place or a very limited number of places therein, when either a side chain or a cross chain breaks the possibilities of repairs at the time and place of breakage is quite limited. Indeed, such chains have been so difficult of repair, even in the shop, that after one or two ruptures of parts, and especially after the tread chains have become well worn, the entire device is usually cast aside, entailing considerable expense in the purchase of new chains. According to these improvements, should a break occur in the side member the repair may at once be made by simply rehooking the parts together in a link contiguous to the broken link, or, if the cross chain should break in the middle, then by substituting therefor another section if the driver has one with him, or by substituting therefor one of the anti-skid chains D, or by rearranging the chains C adjacent to the broken one whereby the gap caused by the broken chain is lessened, thus preserving the efficiency of the safety device for the immediate needs, any of which changes or substitutions being made in a negligible amount of time and without removing the structure from the wheel.

After the urgency of repairs is past, permanent repairs may be made by substituting for the broken part merely a short section of chain at a negligible expense.

It is pointed out that according to the present construction the side members A and B will last indefinitely in service, the interlocking members 12 and the short chain sections 10 being strong and durable. The tread chains necessarily wear away owing to the severe usage they receive and in time will call for replacement by new tread sections. At such time, however, the expense of rehabilitating the device is relatively small, and the owner of the car can, on providing himself with a sufficient number of tread sections, make the substitution in a few minutes' time. It is to be noted, also, that according to these improvements when one side of the cross chains C becomes well worn these chains may be reversed so as to present their inner or unworn sides respectively to the street, all at the expense of only a few minutes' time, and thus a great saving through the increased life of these parts may be effected.

The anti-skid elements D are flexible members secured to the side chains, and are preferably loops. They are also preferably twisted link chains as distinguished from flat link chains, the twisted link chains finding their way under the tire more readily than do the flat link chains and with less likelihood of injury to the tire. These twisted link chains D are preferably the chains of commerce having links about one and three-fourths inches long and three-fourths of an inch wide in outside measurements, and are made of about three-sixteenth inch iron or steel. They have their ends interlocked with spaced apart hook eyes 14, and, as illustrated in Fig. 1, may be variously arranged so as to have their ends closer together or farther apart, or have a greater or less number positioned about the side member as may be desired according to the particular preference of the individual, or the requirements of service. They may be applied to one or both side members of each device, especially on the front wheels of the car; but if applied to the outside only of the rear wheels, which may be desirable on account of the presence of brake apparatus on the inner side of the rear wheels, it is obvious that the elements D on one or the other of the rear devices are in position to take the skidding strains, whichever way the car moves sidewise. These loops D are of such length as to come upon the ground one after the other adjacent to the place where the tire contacts the ground, at which place the links somewhat telescope or pile upon themselves and are there ready to be encroached upon by the tire when sidewise movement of the wheel takes place. The tire at such time overrides the loops as they come in sequence upon the ground so long as the wheel rotates, the loops acting as scrapers upon the ground, each loop in action forming a pocket bounded by flexible angular elements well adapted to resist the lateral movement of the car.

I am aware that heretofore it has been suggested to secure chain loops upon the felly of the wheel for anti-skidding purposes, the ends of the loops being spaced apart and secured to fixtures on the wheel itself. The present improvements have numerous advantages over the hitherto suggested device both structurally and in antiskidding results. Structurally the present improvements comprise merely simple chain sections which may be connected with the side member in various ways as hereinabove mentioned, and may be readily connected and disconnected whereby these elements D may be entirely removed without prejudice to the efficiency of the rest of the device. The employment of special fixtures permanent upon the wheel is hereby avoided and the weakening of the wheel felly, as by through bolts, is rendered unnecessary. The advantages in service are quite important, for instance, in the provision of such antiskidding elements upon a tire chain which is adapted to "creep" upon the wheel, thus continually providing new surfaces of contact by the anti-skidding chains with the tire; also in their association with a tire chain which is so loosely secured upon the wheel that the lower portion of the side members are considerably closer to the ground than are the upper portions thereof (not illustrated, as hereinabove explained, but well understood), whereby the loops D may be considerably shorter than where they are secured in a constantly fixed relation to the wheel, thus avoiding the objection of their contact with the mud guards in vehicles where the mud guards are fairly close to the tire at the top and side portions thereof, such guards being usually closer to the wheel at the top; also in providing a resiliency of action where the entire device is free to move and adjust itself to the strains induced by skidding action; also in the provision of a distribution of the anti-skidding strains substantially over the entire device instead of confining these strains to a single member; as well as in the provision of anti-skidding devices which, when occasion may suggest, may be disconnected at one end, thrown across the tread and connected to the device at the opposite side, thus substituting such an anti-skid element for a tread element when the tread element may break.

It will be noted that the eye portion 14 of the interlocking member 12 has an auxiliary loop portion at 22 adjacent to the closure 15, which special formation is provided in order to prevent the links or eyes held by the eye portion 14 from crowding with great force upon the closure 15 when the rotation of the wheel is reversed, as in backing the car, tending to open the eye and thus permit the continuity of the side member to become broken. While many different forms of single or double interlocking members might be employed in such position, I prefer the simple form of hand operable double hook shown, and with the provision of the loop or belly 22 or other suitable obstructing means for the purpose indicated, this form is highly satisfactory in service and is at the same time cheaply constructed and is strong and durable.

The device being lengthened or shortened by the addition or subtraction of short uniform sections or units it is obvious that the structure may readily be made to fit any size of wheel. For tires of small diameter the cross chains C may be practically shortened by merely hooking the respective elements 12 into a link on each chain C other than the end link.

A feature of utility of the present device resides in its adaptability for service as a towing chain, as for bringing to the garage a disabled car or for getting one out of the ditch. For such purpose the side members may readily be separated from the cross chains and joined end to end, and from a pair of such devices a long and strong towing chain may readily be provided. A stronger draft unit may be formed by uniting several devices in end to end arrangement. As the automobile is not ordinarily equipped with a rope or cable for this purpose, the value of this feature will readily be appreciated by the operators of such cars.

While I have illustrated and described this preferred construction and arrangement of parts, details thereof may be modified without departing from the spirit of my invention, and I contemplate as included therein all changes and modifications as fall within the scope of the appended claims.

I claim:

1. An anti-skid device comprising a pair of annular side members each formed of short units arranged end to end, hand-operable means on each unit whereby the same may be readily attached to and detached from the contiguous unit, and flexible cross units having the end portions of each thereof readily attachable to and detachable from said side members, respectively, by the said hand-operable means.

2. An anti-skid device comprising a pair of annular side members, each formed of short sections of chain alternating with double locking hooks, the locking hooks being provided with an open eye at each end and a spring-pressed hand-operable closure for the opening of each eye, and cross chain sections held by the eyes of oppositely disposed locking hooks and connecting the locking hooks of one side member with corresponding locking hooks of the other side member, the arrangement being such that the locking hooks simultaneously hold the side chains and cross chains in locked yet readily separable relation to each other.

3. An anti-skid device of the character described having annular side members, and having cross members connecting the side members, forming an annular structure having a general circumference adapting it to be positioned loosely on the side and tread portions of a tire whereby it may "creep" upon the tire when in use, a plurality of flexible anti-skid chain loops carried by one side member of the device at intervals around the same and having such length as to come upon the ground one after the other adjacent to the place where the tire touches the ground when normally rotating in service, said loops having their ends spaced apart and being of such length also as to get between the tire and the ground when the tire moves side-wise as in "skidding."

4. An anti-skid device comprising a pair of annular side members, each formed of short sections of chain alternating with double locking hooks, each hook part having an opening in the side and a spring-closed hand-operable closure for said opening, with means adjacent to the opening for maintaining the chain section with which the hook is interlocked against its coming upon said closure when the device is normally in use, and cross-chain sections connecting the locking hooks of one side member with corresponding locking hooks of the other side member, there being as many of the double locking hooks as there are cross chain sections, the arrangement being such that the locking hooks simultaneously hold the side chains and cross chains in locked yet readily separable relation to each other.

CHARLES WALLACE POORMAN.